United States Patent Office 3,657,151
Patented Apr. 18, 1972

3,657,151
CATALYST MANUFACTURE
Edward D. Noble, San Rafael, Calif., assignor to Chevron Research Company, San Francisco, Calif.
No Drawing. Filed Jan. 15, 1970, Ser. No. 3,239
Int. Cl. B01j 11/40, 11/82
U.S. Cl. 252—437
9 Claims

ABSTRACT OF THE DISCLOSURE

A process for producing catalysts with larger average pore diameters which comprises (a) forming a hydrogel comprising at least one inorganic oxide, (b) adding a detergent to the hydrogel, and (c) carrying out at least part of the drying of the hydrogel after the detergent is added to the hydrogel. Preferably the detergent is a nonionic high molecular weight detergent composed only of carbon, hydrogen, and oxygen.

BACKGROUND OF THE INVENTION

The present invention relates to catalyst manufacture, particularly catalyst for use in the conversion of hydrocarbons to more valuable hydrocarbons. More particularly, the present invention relates to the manufacture of catalyst with larger pores than would be achieved without the use of the process of the present invention.

In a number of catalytic hydrocarbon processes, it is desirable to alter the pore structure of the catalyts. For example, in desulfurizing residual petroleum oil fractions containing several parts per million metals or more, a catalyst with only very small pore sizes generally has been found to have a relatively short life (the life of the catalyst being the period for which it is effective to achieve desulfurization within reasonable temperature limitations).

U.S. Pat. 3,383,301 is directed to a process for the catalytic hydrodesulfurization of sulfur - containing petroleum oils containing metallic contaminants using a catalyst which has increased tolerance for metallic contaminants. The improved results obtained according to U.S. Pat. 3,383,301 are achieved with a catalyst having an increased amount of relatively large pores, for example, pores above about 40–50 A., and particularly pores above about 100 A. The pores sizes in U.S. Pat. 3,383,301 are reported in terms of pore radius rather than pore diameter.

It has been theorized that the metallic contaminants present in heavy oil, particularly in residual petroleum oil fractions, rapidly plug up the entrance to catalyst micropores. Thus in catalysts having essentially only micropores, the surface of the catalyst is rapidly blocked off by metals depositing at the entrance to the catalyst micropores during conversion reactions applied to hydrocarbon feeds containing metallic contaminants. On the other hand, for catalysts with larger pores, the organometallic contaminants present in the feed can diffuse further into the catalyst and thereby deposit metals on an interior surface of the catalyst rather than depositing metals only on the peripheral surface of the catalyst. Thus, catalysts having larger average pore diameters, particularly catalysts having average pore diameters above 50 A., and catalysts having a substantial amount of macropores, have been found to have a considerably greater metals capacity than catalysts having substantially only relatively small pores.

The term "macropores" is used herein to connote pores having a diameter greater than about 80 A., and usually in the order to 500 A., whereas the term "micropores" is used to connote pores having a diameter less than about 80 A., and usually in the order of 10–40 A.

Various methods have been developed for increasing pore size and obtaining macroporous catalysts. For example, it has been disclosed that catalysts of increased pores sizes may be obtained by adding titianium recycle catalyst fines or other various fine solid particles.

Johnson and Mooi, in the Journal of Catalysis, 10, 342–354 (1968), discuss pore distribution in alumina catalysts. In their discussion, reference is made to treating alumina gels with methanol to exchange methanol for water in the alumina gels. The catalyst obtained upon drying and calcining had larger pore sizes than for those catalysts which were not treated with methanol to replace water prior to drying and calcining.

However, methanol is hazardous as it is very poisonous, even when used externally. If taken internally in small quantities it causes blindness by paralyzing the optic nerve. Larger amounts cause death. Moreover, under commercial catalyst manufacturing conditions, we have found that consistently satisfactory results were not achieved using methanol to replace water or a portion of the water in the undried catalyst material.

Accordingly, an object of the present invention is to provided a relatively nonhazardous and economically attractive method that will more consistently give good pore size expansion, that is, larger pores under a variety of commercial catalyst production conditions.

SUMMARY OF THE INVENTION

According to the present invention, a process is provided for producing catalysts with larger average pore diameters which comprises (a) forming a hydrogel comprising at least one inorganic compound (which is typically converted to an oxide upon subsequent calcination), (b) adding a detergent to the hydrogel, and (c) carrying out at least part of the drying of the hydrogel after the detergent is added to the hydrogel.

According to a preferred embodiment of the present invention, at least 0.01 weight percent of the detergent is added to the hydrogel based on the weight of the hydrogel. More preferably between about 0.2 and 2.0 weight percent detergent is added to the hydrogel material.

The formation of hydrogels is described in the literature, including U.S. Pat. 3,248,342 and U.S. Pat. 3,390,-100, the disclosures of which patents are incorporated by reference into the present patent application.

Various detergents, or soaps, can be used in the process of the present invention. Detergents generally are considered to fall within three general classifications: anionic, cationic, and nonionic detergents. These detergents are all considered to be operable within the process of the present invention.

However, it is particularly preferred to use a nonionic, high molecular weight detergent composed only of carbon, hydrogen, and oxygen atoms in the process of the present invention. The single most important reason why the nonionic high molecular weight detergent composed only of carbon, hydrogen, and oxygen is preferred is that surprisingly good results and consistent results have been obtained in using such detergent to obtain catalyst of increased average pore diameter. Also, the nonionic detergent is composed only of carbon, hydrogen, and oxygen, and thus no ions are left in the catalyst after the catalyst is dried and calcined. In the case of cationic detergents, a contaminating ion such as sodium, potassium, or calcium could be left in the catalyst as a result of the detergent treatment during catalyst manufacture. Also, in the case of the anionic detergent, a contaminating ion such as chloride or bromide could be left in the catalyst.

It is not known exactly how the detergent operates to yield this result, but it is theorized that the detergent may lower the surface tension of the water and thus help to prevent collapse or reduction of the pore structure or pore sizes during drying, and it is also theorized that high molecular weight detergent, preferably of molecular weight 300, and still more preferably of molecular weight 500 or more, operates to reduce the rate of evaporation during at least the initial part of a given drying operation so that the pore structure does not as readily shrink in size as would be the case if the high molecular weight detergent were not used.

The process of the present invention can be applied to a wide variety of inorganic oxide hydrogels. However, the process of the present invention has been found to give particularly good results when applied to hydrogels comprising at least cogelled aluminum and silicon compounds. Hydrogels formed by coprecipiation of inorganic refractory support materials, such as aluminum or aluminum compounds and silicon or silicon compounds, together with Group VI-B and/or Group VIII-B metals or metal compounds have been found to be particularly amenable to treatment according to the present invention to form catalysts having increased pore sizes. Also, hydrogel material to which crystalline alumino-silicate molecular sieve or alumino-silicate clay-like material is added can be treated according to the process of the present invention but the present invention more preferably is applied to catalysts formed essentially entirely by cogellation of the catalyst constituents. Preferably the detergent is added to the above-mentioned hydrogel before the hydrogel is subjected to the final catalyst forming step, for example, before the hydrogel material is extruded.

Generally, when the detergent is added to the hydrogel material, one or more inorganic compounds are present in the hydrogel in the form of hydroxides, such as aluminum hydroxide, and there is usually a substantial amount of occluded water in the hydrogelled precipitate as is typical with hydrogels. Although it is particularly preferred in the process of the present invention to add the detergent after the hydrogel precipitate is formed, the process of the present invention is also operable if the detergent is added prior to formation of the hydrogel precipitate as, for example, when the components of the gel material are being blended or mixed together.

Particular hydrodesulfurization catalysts which may be expanded in accordance with the present invention include composites comprising discrete substantially insoluble metal phosphate particles surrounded by a continuous phase matrix comprising at least one solid oxide and at least one hydrogenating component selected from Group VI-B metals, and compounds thereof, and Group VIII-B metals, and compounds thereof. Particularly preferred catalyst composites for production in expanded form in accordance with the process of the present invention are described in more detail in U.S. Pat. 3,493,517, which patent disclosure is incorporated by reference into the present patent specification.

In the process of the present invention, the detergent is preferably added to or mixed with the hydrogel prior to the final drying of the hydrogel material. Usually one or more steps of washing of the hydrogel or slurry will precede addition of the detergent, and a washing step may follow addition of the detergent, and a final drying step as well as calcination will follow detergent addition.

DESCRIPTION OF EXAMPLES

Table I below compares catalysts obtained using the process of the present invention versus catalysts produced without adding detergent to the hydrogel catalyst components.

TABLE I.—EFFECT OF DETERGENT ON CATALYST PROPERTIES

| | Run No. | Detergent dosage, wt. percent | Area, m.²/g. | Pore vol., cc./g. | Pore diameter avg., A. | Particle density, g./cc. |
|---|---|---|---|---|---|---|
| Catalyst A: | | | | | | |
| Standard | 1 | 0 | 310 | 0.312 | 40 | 1.66 |
| Commercial | 2 | 0.5 | 285 | 0.408 | 57 | 1.46 |
| Do | 3 | ~0.3 | 337 | 0.441 | 53 | 1.47 |
| Catalyst B: | | | | | | |
| Standard | 4 | 0 | 339 | 0.312 | 37 | 1.63 |
| Commercial | 5 | 0.5 | 326 | 0.415 | 51 | 1.44 |
| Do | 6 | ~0.2 | 351 | 0.428 | 49 | 1.42 |
| Catalyst C: | | | | | | |
| Standard | 7 | 0 | 249 | 0.55 | 88 | 1.20 |
| Test No.: | | | | | | |
| 1 | 8 | 0.5 | 277 | 0.69 | 100 | 1.06 |
| 2 | 9 | 1.0 | 275 | 0.70 | 102 | 1.08 |

Catalyst A composition consisted of a cogel of nickel compounds and tungsten compounds together with three refaractory inorganic oxides. Catalyst B, referred to in Table I, was the same as Catalyst A except that Catalyst B contained about 10% added crystalline aluminosilicate molecular sieve material. Catalyst C was a nickel-molybdenum catalyst with three refractory inorganic oxides (after calcination) but no silica. Catalyst C is a particularly preferred type catalyst for expansion in accordance with the present invention. Catalyst C is further described in Ser. No. 671,994 now U.S. Pat. 3,493,517. In the case of Catalysts A, B and C, and hydrogel slurry was formed by coprecipitation of the various catalyst components. In the case of Catalysts A, B, and C, subsequent to filtration of excess water from the hydrogel, a detergent was added for Runs 2, 3, 5, 6, 7, and 9 in Table I. The particular detergent was Oronite NI-W. This detergent is a tetrapropylene phenyl ethoxylate having a molecular weight of about 600 and being composed only of carbon hydrogen, and oxygen atoms. The detergent structure is not known exactly. The general steps which are used to obtain the detergent include the alkylation of phenyl with tetrapropylene to make mainly monoalkylphenyl, but also some dialkyl phenyls are made. The alkylphenyls are then reacted with ethylene oxide to add a long chain of ethylene oxide groups, generally amounting to about 10 repeating ethylene oxide units, and having an OH group on the end. The ethylene oxide polymeric group which is added to the alkylphenyl is the hydrophyllic constitutent of the detergent.

After the detergent is added to the hydrogel, the hydrogel is extruded, dried and calcined to thereby obtain catalyst particles of the order of $\frac{1}{16}''-\frac{1}{8}''$ in diameter.

As can be seen from Table I using standard catalyst manufacturing procedures, that is, without the added high molecular weight nonionic detergent, the pore size was about 40 A. in the case of Catalyst A and about 37 A. in the case of Catalyst B. However, with the high molecular weight nonionic detergent added, the average pore diameter was about 57 to 49 for the Catalysts A and B, or about a 31–42% increase in average pore size. The catalysts with the increased pore size were found to have considerably longer effective life in hydrodesulfurization of hydrocarbon contaminated with several parts per million or more organometallic compounds.

Although various specific embodiments of the invention have been described and shown, it is to be understood that they are meant to be illustrative only and not limiting. Certain features may be changed without departing from the spirit or essence of the invention. It is apparent that the present invention has broad application to the manufacture of catalysts with increased average pore sizes using a detergent prior to final drying of the catalyst material. Accordingly, the invention is not to be construed

I claim:

1. A process for producing catalysts with larger average pore diameters which comprises:
   (a) forming a hydrogel comprising at least one inorganic compound;
   (b) adding a detergent to the hydrogel;
   (c) extruding the hydrogel containing the added detergent; and
   (d) then carrying out at least part of the drying of the hydrogel containing the added detergent.

2. A process in accordance with claim 1 wherein at least 0.01 weight percent of the detergent is added to the hydrogel, based on the weight of the hydrogel.

3. A process in accordance with claim 1 wherein between 0.2 and 2.0 weight percent of the detergent is added to the hydrogel based on the weight of the hydrogel.

4. A process in accordance with claim 3 wherein the detergent is a nonionic high molecular weight detergent composed only of carbon, hydrogen, and oxygen.

5. A process in accordance with claim 1 wherein the hydrogel contains at least aluminum and silicon compounds.

6. A process in accordance with claim 5 wherein the catalyst also contains Group VI-B and/or Group VIII-B metals or metal compounds.

7. A process in accordance with claim 6 wherein the catalyst also contains a crystalline alumino-silicate molecular sieve material.

8. A process in accordance with claim 1 wherein the catalyst produced is a catalyst composite comprising discrete substantially insoluble metal phosphate particles, wherein said metal phosphate consists essentially of at least one metal phosphate selected from the phosphates of zirconium, titanium, tin, thorium, cerium and hafium.

9. A process in accordance with claim 1 wherein the average pore diameter of the catalyst produced is expanded by at least 12 A.

References Cited

UNITED STATES PATENTS

| | | | |
|---|---|---|---|
| 3,258,311 | 6/1966 | Burzynski et al. | 252—451 X |
| 3,321,276 | 5/1967 | Burzynski et al. | 252—451 X |
| 3,493,517 | 2/1970 | Jaffe | 252—437 |
| 2,697,066 | 12/1954 | Sieg | 252—451 X |

CARL F. DEES, Primary Examiner

U.S. Cl. X.R.

252—453, 455 Z, 458, 459